No. 815,572. PATENTED MAR. 20, 1906.
J. K. WILLIAMS.
VEHICLE TIRE.
APPLICATION FILED SEPT. 5, 1905.
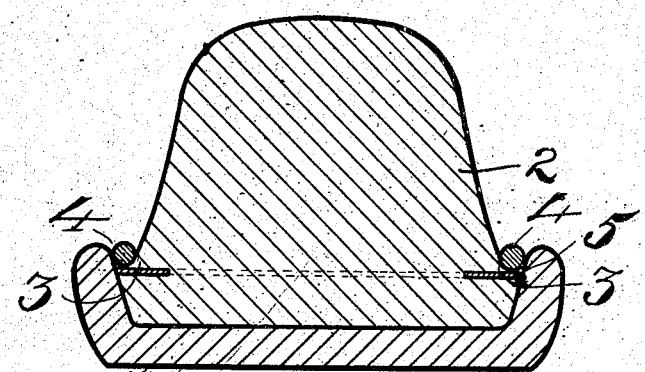
Fig. 1.
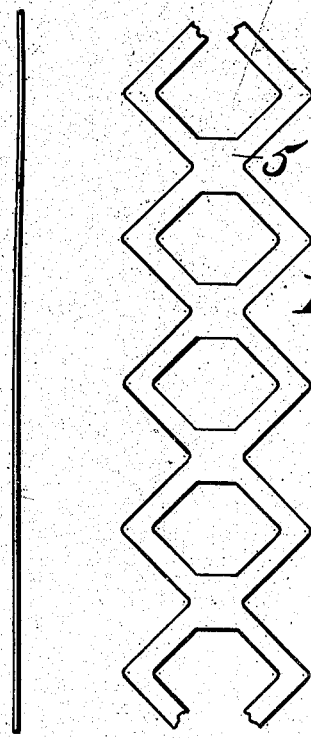
Fig. 2. Fig. 3.
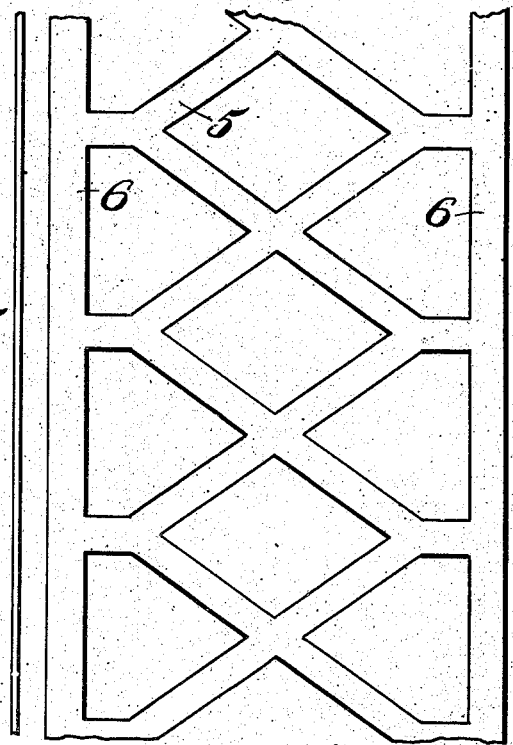
Fig. 4.
Fig. 5.
Witnesses:
A. Percy Buchtel
Edna Bortz
Inventor:
John K. Williams
by C. E. Humphrey
Atty.

UNITED STATES PATENT OFFICE.

JOHN K. WILLIAMS, OF AKRON, OHIO.

VEHICLE-TIRE.

No. 815,572.　　　Specification of Letters Patent.　　Patented March 20, 1906.

Application filed September 5, 1905. Serial No. 277,024.

*To all whom it may concern:*

Be it known that I, JOHN K. WILLIAMS, a citizen of the United States, residing at Akron, in the county of Summit and State of Ohio, have invented new and useful Improvements in Vehicle-Tires, of which the following is a specification.

This invention relates generally to improvements in solid elastic vehicle-tires and the means whereby they are retained in position on a vehicle-wheel, and has especial relation to that type of tires known as "side-wire tires," which comprise one or more circumferential retaining-bands arranged along one or both of the sides of the tire to act as the primary retaining means by which the elastic tire is secured in its seat in the metallic rim.

Tires of the foregoing type are generally seated in a metallic rim provided with upwardly and outwardly projecting side flanges, and the elastic tires which are to seat therein are so formed as to have along their sides circumferential wire-seats so disposed that when the retaining-wires are placed in the seats the side flanges of the rim will ordinarily prevent the lateral slipping of the retaining-wires from position.

In addition to the circumferential retaining-wires it is customary to insert in the base portion of the body of the tire at intervals throughout its entire circumference a series of transverse wires or bars so positioned that their outer ends are exposed in the seats formed along the sides of the tire-body sufficiently to permit the side or circumferential wires to engage them and rest thereon.

At the present time the inserting of transverse wires in the tire-base is generally done after the tire is formed by a tire-forming machine and before vulcanization, and great difficulty is found in doing this with accuracy and without distorting the tire.

The object of my invention is to construct a tire of this general type wherein the transverse element for sustaining the side wires will be continuous and may be incorporated in the tire-body while issuing from the tire-forming machine, thereby avoiding the expense and annoyance of subsequently inserting this element in a previously-formed tire.

Among the advantages obtained by this construction are greater security against displacement and increased strength, both very desirable in the manufacture of vehicle-tires.

With the foregoing and other objects in view the invention consists of the novel construction, combination, and arrangement of parts constituting the tire, to be hereinafter referred to and illustrated in the accompanying drawings, which form a part of this specification, in which is shown the preferred embodiment of the invention; but it is to be understood that changes, variations, and modifications can be resorted to which come within the scope of the claim hereunto appended.

In the drawings, in which similar reference-numerals indicate like parts in the different figures, Figure 1 is a transverse section of a wheel-rim and a tire mounted thereon embodying my improvement. Fig. 2 is a side elevation of one form of my improved transverse element previous to its insertion in a tire-body. Fig. 3 is a plan view of the device shown in Fig. 2. Fig. 4 is a plan view of a slight modification of the device shown in Fig. 3, and Fig. 5 is a side elevation of the device shown in Fig. 4.

In the drawings the reference characters 1 and 2 respectively represent the rim of a vehicle-wheel and an elastic tire mounted thereon.

The rim 1 is of the ordinary flanged type in common use, and the tire 2 externally has the common conformation usually imparted to side-wire tires. This tire 2 is provided along its sides with wire seats 3, on which are tightly-strained circumferential wires 4. The position of the wire seats 3 is such that the wires 4 are assisted in remaining thereon by the side flanges of the rim 1.

Extending longitudinally the entire length of the tire is my improved side-wire-sustaining element 5, consisting of a continuously-formed strip of suitable material (preferably sheet metal) provided throughout with perforations therethrough and of a transverse width at its widest part equivalent to the transverse width of the base portion of the tire 2 immediately below the side-wire seats 3. This sustaining element 5 is so positioned transversely in the tire-body that its outer side portions thereof are approximately exposed along the base portions of the seats 3, thus enabling the circumferential retaining-wires 4 to rest thereon, thereby causing the pressure which they are intended to exert toward the wheel center to be distributed over the entire element 5 approximately equally.

It will be stated that in placing the element 5 in the body of the tire it is preferably done during the operation of issuing the tire from a forming-machine, so that the material of the tire-body above and below the element 5 will be preferably united together through the perforations in said element at the time the tire-body is shaped by the die of the forming-machine, and the element 5 will be immovably secured in position by the subsequent vulcanization of the tire-body.

In manufacturing my improved sustaining element for the side wires of a tire a large variety of patterns and shapes may be employed, all substantially mechanically equivalent, but differing in specific design, as illustrated in the drawings by Figs. 3 and 4.

It will be seen by reference to these figures that the element 5 in Fig. 3 is provided with serrated edges, the extended points of which are arranged to sustain the side wires, while in the form shown in Fig. 4 the sides of the element 5 are provided with continuous strips 6, which are arranged to receive and sustain the side wires; but in both these forms shown sufficiently large perforations exist to permit the perfect union of the tire material therethrough, which effectually anchors this element in position at all times.

What I claim is—

The combination in a vehicle-tire adapted to seat in a channeled rim, formed of elastic material and provided with a tread portion and integral side shoulders of sufficient width to permit the seating thereon of tire-retaining means, tire-retaining means consisting of circumferentially-arranged bands mounted on said shoulders in a state of tension, and a continuously-formed stiffening device embedded in the body of said tire of sufficient width to extend between the sides of said tire at such a point in the body thereof that the outer side edges will be exposed and form the bottom of the shoulders along said tire-body, said stiffening means being formed of a continuous strip of metal provided with a series of regularly-recurring openings, so shaped that the strips of metal existing between said openings will extend obliquely through the tire-body.

In testimony whereof I have hereunto set my hand in presence of two subscribing witnesses.

JOHN K. WILLIAMS.

Witnesses:
C. E. HUMPHREY,
GLENARA FOX.